(12) United States Patent
Baines et al.

(10) Patent No.: US 10,592,317 B2
(45) Date of Patent: *Mar. 17, 2020

(54) TIMEOUT PROCESSING FOR MESSAGES

(71) Applicant: International Business Machines Corporation, Armonk, NY (US)

(72) Inventors: Jack S. Baines, Winchester (GB); Kirstine F. L. Clapperton, Southampton (GB); David J. Crighton, Southampton (GB); Rosanna M. Lickorish, London (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,439

(22) Filed: Jan. 9, 2019

(65) Prior Publication Data

US 2019/0146859 A1 May 16, 2019

Related U.S. Application Data

(63) Continuation of application No. 15/156,407, filed on May 17, 2016, now Pat. No. 10,223,179.

(51) Int. Cl.
*G06F 9/46* (2006.01)
*G06F 9/54* (2006.01)

(52) U.S. Cl.
CPC .................. *G06F 9/546* (2013.01)

(58) Field of Classification Search
None
See application file for complete search history.

(56) References Cited

U.S. PATENT DOCUMENTS

| 5,396,613 | A | 3/1995 | Hollaar |
| 6,263,368 | B1 | 7/2001 | Martin |
| 6,279,001 | B1 * | 8/2001 | DeBettencourt ..... G06F 11/0709 |
| 6,442,139 | B1 * | 8/2002 | Hosein .................... H04L 47/10 |
| | | | 370/236 |

(Continued)

OTHER PUBLICATIONS

Tozer, Sean, Avoiding Bad Query Mixes to Minimize Unsuccessful Client Requests Under Heavy Loads, Waterloo, Ontario, Canada, 2009, https://cs.uwaterloo.ca/~ashraf/theses/TozerMMath09.pdf, captrued Oct. 12, 2015, 60 pages.

(Continued)

*Primary Examiner* — Hiren P Patel
(74) *Attorney, Agent, or Firm* — Schmeiser, Olsen & Watts, LLP; William Hartwell (57) ABSTRACT

A method for message handling in a work dispatcher computer system that includes a client computer, a dispatch queue and processing nodes. A total time is a sum of a first time value (an estimate of time that a message received from the client computer spends in a dispatch queue, based on an average time that N individual messages previously spent in the dispatch queue) and a second time value (an estimate of a minimum or average time for the message to be processed by the processing nodes). In response to determining that N s at least a specified threshold, it is ascertained whether a defined timeout period is not less than a specified threshold percent of the total time. If so, the message is sent to the dispatch queue and then to one of the processing nodes. If not, a timeout error indication is sent to the client computer.

20 Claims, 6 Drawing Sheets

(56) References Cited

U.S. PATENT DOCUMENTS

| | | |
|---|---|---|
| 6,950,885 B2 | 9/2005 | Shah |
| 7,110,995 B2 | 9/2006 | Kirkland |
| 7,376,741 B1 | 5/2008 | Carter et al. |
| 7,409,676 B2 | 8/2008 | Agarwal et al. |
| 7,748,002 B1 | 6/2010 | Beser |
| 8,589,946 B2 | 11/2013 | Schneider et al. |
| 8,732,393 B2 | 5/2014 | Iwasaki et al. |
| 8,856,598 B1 | 10/2014 | Madahar et al. |
| 9,268,605 B2* | 2/2016 | Wang .................. G06F 9/50 |
| 9,319,365 B1 | 4/2016 | Milyakov |
| 9,544,403 B2 | 1/2017 | Tran et al. |
| 9,858,131 B2* | 1/2018 | Mishin ................ G06F 9/546 |
| 9,887,928 B2 | 2/2018 | Wang et al. |
| 9,960,960 B2 | 5/2018 | Chen et al. |
| 2002/0091746 A1* | 7/2002 | Umberger ............ G06F 3/0613 |
| | | 718/105 |
| 2002/0174395 A1 | 11/2002 | Chen et al. |
| 2003/0163478 A1 | 8/2003 | Kirkland |
| 2003/0200252 A1 | 10/2003 | Krum |
| 2005/0060163 A1 | 3/2005 | Barsness et al. |
| 2005/0265362 A1* | 12/2005 | Kawashima .......... H04L 51/14 |
| | | 370/401 |
| 2006/0285509 A1 | 12/2006 | Asplund |
| 2008/0086285 A1 | 4/2008 | Gombas et al. |
| 2010/0253977 A1* | 10/2010 | Kunori ............... G03G 15/5066 |
| | | 358/1.15 |
| 2010/0293268 A1 | 11/2010 | Jones et al. |
| 2012/0089726 A1* | 4/2012 | Doddavula .......... G06F 9/5072 |
| | | 709/224 |
| 2012/0096137 A1 | 4/2012 | He |
| 2013/0339759 A1* | 12/2013 | Doddavula .......... G06F 1/3206 |
| | | 713/300 |
| 2014/0047452 A1 | 2/2014 | Ceze et al. |
| 2014/0229221 A1 | 8/2014 | Shih et al. |
| 2014/0245325 A1 | 8/2014 | Blackman et al. |
| 2014/0317515 A1 | 10/2014 | Suda |
| 2014/0325524 A1* | 10/2014 | Zangaro ............... G06F 9/5083 |
| | | 718/105 |
| 2014/0372516 A1 | 12/2014 | Watte et al. |
| 2014/0380309 A1 | 12/2014 | Kobayashi |
| 2015/0268996 A1 | 9/2015 | Fan et al. |
| 2015/0381549 A1 | 12/2015 | Word |
| 2016/0128059 A1 | 5/2016 | Hsu et al. |
| 2017/0103457 A1 | 4/2017 | Acuna-Rohter et al. |
| 2017/0337090 A1 | 11/2017 | Baines et al. |
| 2019/0207872 A1* | 7/2019 | Hallivuori .......... H04L 43/0852 |

OTHER PUBLICATIONS

Carter et al., Detecting Timed-Out Client Requests for Avoiding Livelock and Improving Web Server Performance, Oct. 12, 2015, 6 pages.

Office Action (dated May 18, 2018) for U.S. Appl. No. 15/156,407, filed May 17, 2016.

Amendment (dated Aug. 20, 2018) for U.S. Appl. No. 15/156,407, filed May 17, 2016.

Notice of Allowance (dated Oct. 19, 2018) for U.S. Appl. No. 15/156,407, filed May 17, 2016.

\* cited by examiner

TIMEOUT PROCESSING FOR MESSAGES

This application is a continuation application claiming priority to Ser. No. 15/156,407, filed May 17, 2016.

TECHNICAL FIELD

The present invention relates generally to a method and apparatus for input loads in flow based architecture, and more particularly to timeout processing for messages.

BACKGROUND

In a flow based architecture, an application uses a worker dispatcher model where requests can be handled by a dispatcher before being passed to one or more process nodes to process a worker thread.

Figure 1A:
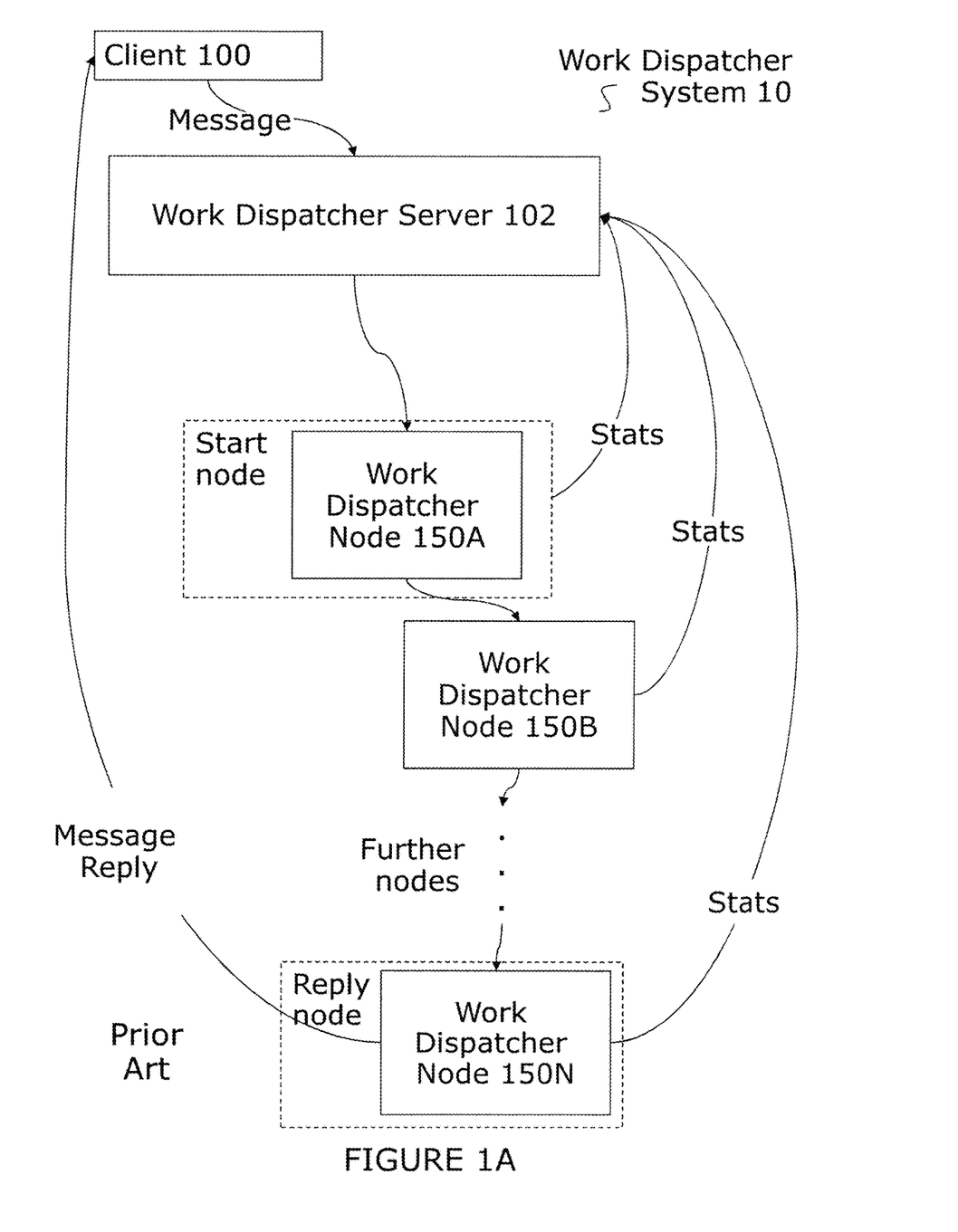
FIG. 1A is a prior art schematic representation of a work dispatcher system.

FIG. 1A is a prior art schematic representation of a work dispatcher system 10. The work dispatcher system 10 includes: a client 100, a work dispatcher server 102, and work dispatcher nodes 150A, 150B . . . 150N. Client 100 may send a message (e.g., a hypertext protocol request for a Web page) to work dispatcher server 102. Work dispatcher server 102 is configured to send the message to one or more work dispatcher nodes (150A, 150B, . . . 150N) for processing. The first node (150A) that the message is sent to is a start node. The last node (150N) the message ends up at is a reply node and may send a message reply (e.g., a Web page or component) to client 100. Each work dispatcher node sends statistics back to work dispatcher server 102 about respective processing performed at the node and, in particular, the start time and finish time of the message at each work dispatcher node.

Shortly after a node receives a message from the work dispatcher server 102, a dispatcher timeout may expire, resulting in the work dispatcher dispatcher 102 closing the connection with the nodes and returning a timeout to the client 100. Since the nodes have no way of detecting the dispatcher timeout, the nodes will continue processing the request until the reply node 150N tries to send a reply, which will fail, since the work dispatcher server 102 has already closed the connection. There are two main issues that this current approach has: time and resource is pointlessly spent processing the message after the dispatcher timeout has occurred; and exception handling is expensive and when the reply node 150 N is reached, a connection error is required. Since the dispatcher timeout generally occurs under high load, this expensive error handling can exasperate the issue by slowing down the rate at which messages are picked up and is therefore more likely to contribute to increasing the occurrence of dispatcher timeout for future messages, thereby creating a snowball effect.

SUMMARY

The present invention provides a method, and associated work dispatcher system and computer program product, for message handling in the work dispatcher system that includes a client and one or more processing nodes. One or more processors of the work dispatcher system receive a message from the client. The one or more processors determine a total system period for the message to pass through the work dispatcher system. The one or more processors send a timeout error indication to the client if a timeout period is determined to be smaller than the total system period.

BRIEF DESCRIPTION OF THE DRAWINGS

Embodiments of the present invention will now be described, by way of example only, with reference to the following drawings.

DETAILED DESCRIPTION

Figure 1B:
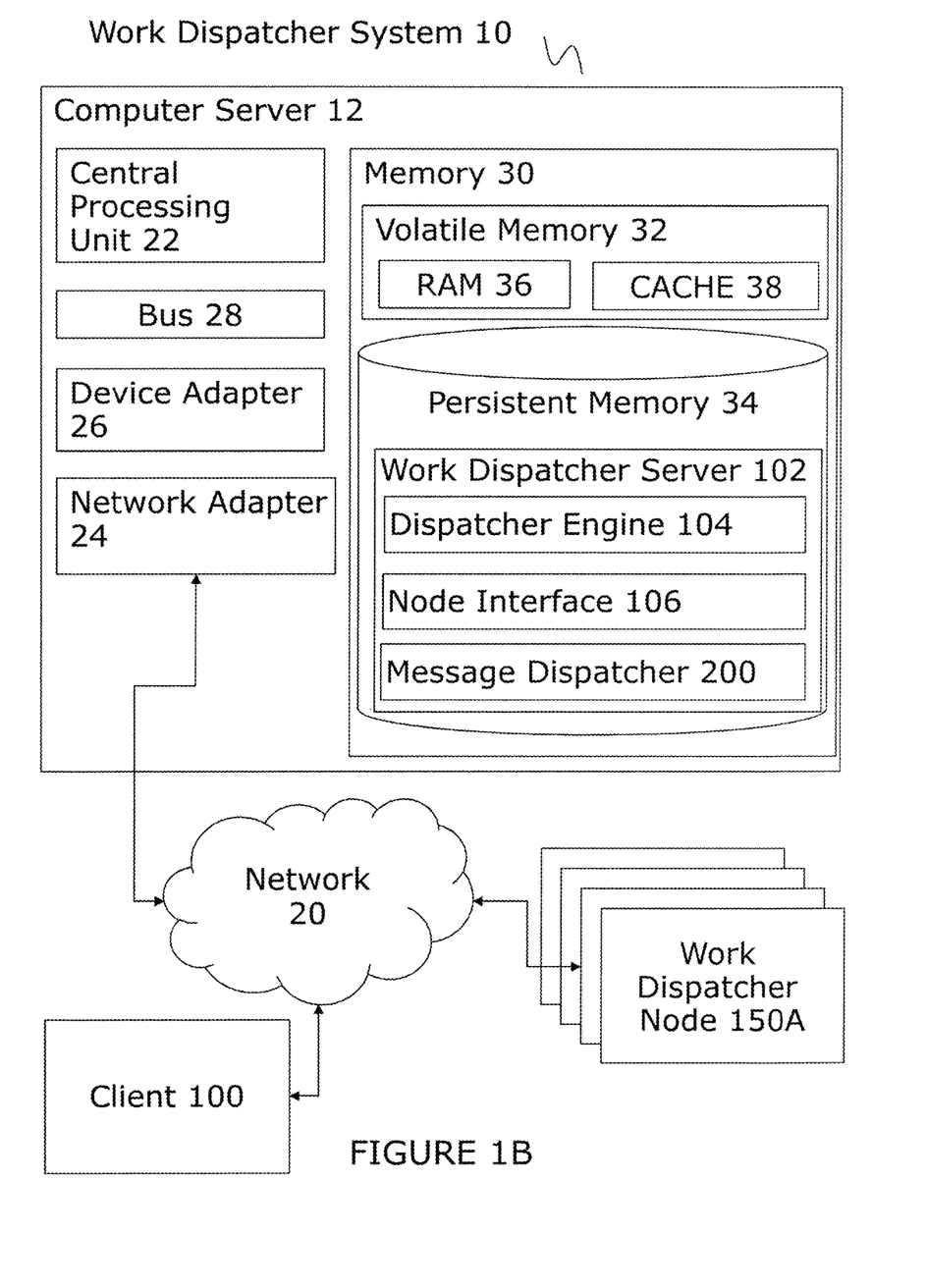
FIG. 1B is a diagram of a work dispatcher system that includes a computer server, in accordance with embodiments of the present invention.

FIG. 1B is a diagram of a work dispatcher system 10 that includes a computer 12, in accordance with embodiments of the present invention. Work dispatcher system is operational with numerous other general purpose or special purpose computing system environments or configurations. Examples of well-known computing processing systems, environments, and/or configurations that may be suitable for use with work dispatcher system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment for example where a computer processing system is a third party service performed by one or more of a plurality computer processing systems. A distributed computer environment also includes an Internet of things computing environment, for example, where computer processing systems are distributed as a network of objects that can interact with a computing service.

Work dispatcher system 10 may be described in the general context of computer system executable instructions, such as program modules, being executed by a computer processor. Generally, program modules may include: routines; programs; objects; components; logic; and data structures that perform particular tasks or implement particular data types. Work dispatcher system 10 may be embodied in distributed cloud computing environments where tasks are performed by remote processing devices that are linked through a communications network. In a distributed cloud computing environment, program modules may be located in both local and remote computer system storage media including memory storage devices.

Work dispatcher system 10 comprises: computer server 12, network 20, at least one client 100, and work dispatcher nodes 150A to 150N. Network 20 can, in one embodiment, be a local area network (LAN), a wide area network (WAN), or the Internet.

Computer server 12 comprises: central processing unit (CPU) 22, network adapter 24, device adapter 26, bus 28 and memory 30.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, wherein the machine instructions are written in a machine code language which is referred to a low level language. A computer program written in a high level language needs to be compiled to a machine code program before the computer program can be run. Alternatively a machine code program such as a virtual machine or an interpreter can interpret a high level language in terms of machine operations.

Network adapter 24 is configured to enable communication between the computer server 12 and network devices.

Device adapter 26 is configured to enable communication between computer server 12 and both input devices and output devices.

Bus 28 couples system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable hardware media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally volatile memory is used because volatile memory is faster and generally non-volatile memory is used because non-volatile memory will hold the data for longer periods of time. Work dispatcher system 10 may further include other removable and/or non-removable, volatile and/or non-volatile computer system storage media. By way of example only, persistent memory 34 can be provided for reading from and writing to a non-removable, non-volatile magnetic media (not shown and for example a magnetic hard disk or solid-state drive). Although not shown, further storage media may be provided including: an external port for removable, non-volatile solid-state memory, and an optical disk drive for reading from or writing to a removable, non-volatile optical disk such as a compact disk (CD), digital video disk (DVD) or Blu-ray. Each storage media can be connected to bus 28 by one or more data media interfaces.

As will be further depicted and described below, memory 30 includes a work dispatcher server 102 and may further include a computer program product that includes modules of program code configured to carry out the functions of embodiments of the invention upon being executed by the CPU 22. Work dispatcher server 102 comprises the following components: dispatcher engine 104, node interface 106, and message dispatcher 200. In one embodiment, work dispatcher server 102 is loaded from the persistent memory 34, and work dispatcher server 102 may be stored, into volatile memory 32 for operation. In another embodiment, ROM in memory 30 stores the components of work dispatcher server 102 for enabling the computer server 12 to function as a special purpose computer specific to the work dispatcher server 102. Further program modules that support the embodiments of the present invention but are not shown may include firmware, boot strap program, operating system, and support applications. Each of the operating system, support applications, other program modules, and program data, or some combination thereof, may include an implementation of a networking environment.

Work dispatcher system 10 communicates with at least one network 20 (such as a local area network (LAN), a general wide area network (WAN), and/or a public network (e.g., the Internet) via network adapter 24. Network adapter 24 communicates with the other components of computer server 12 via bus 28. It should be understood that although not shown, other hardware and/or software components could be used in conjunction with work dispatcher system 10. Examples of other hardware and/or software components include, but are not limited to: microcode, device drivers, redundant processing units, external disk drive arrays, redundant array of independent disks (RAID), tape drives, and data archival storage systems.

Dispatcher engine 104 is configured to manage the general operation of the work dispatcher system 10.

Node Interface 106 is configured to receive feedback statistics from processing nodes such as start and finish times of messages and in particular to calculate a processing time for a message passing through a sequence of processing nodes and to calculate a minimum time for a message in a batch of messages passing through the sequence of processing nodes.

Figure 2:
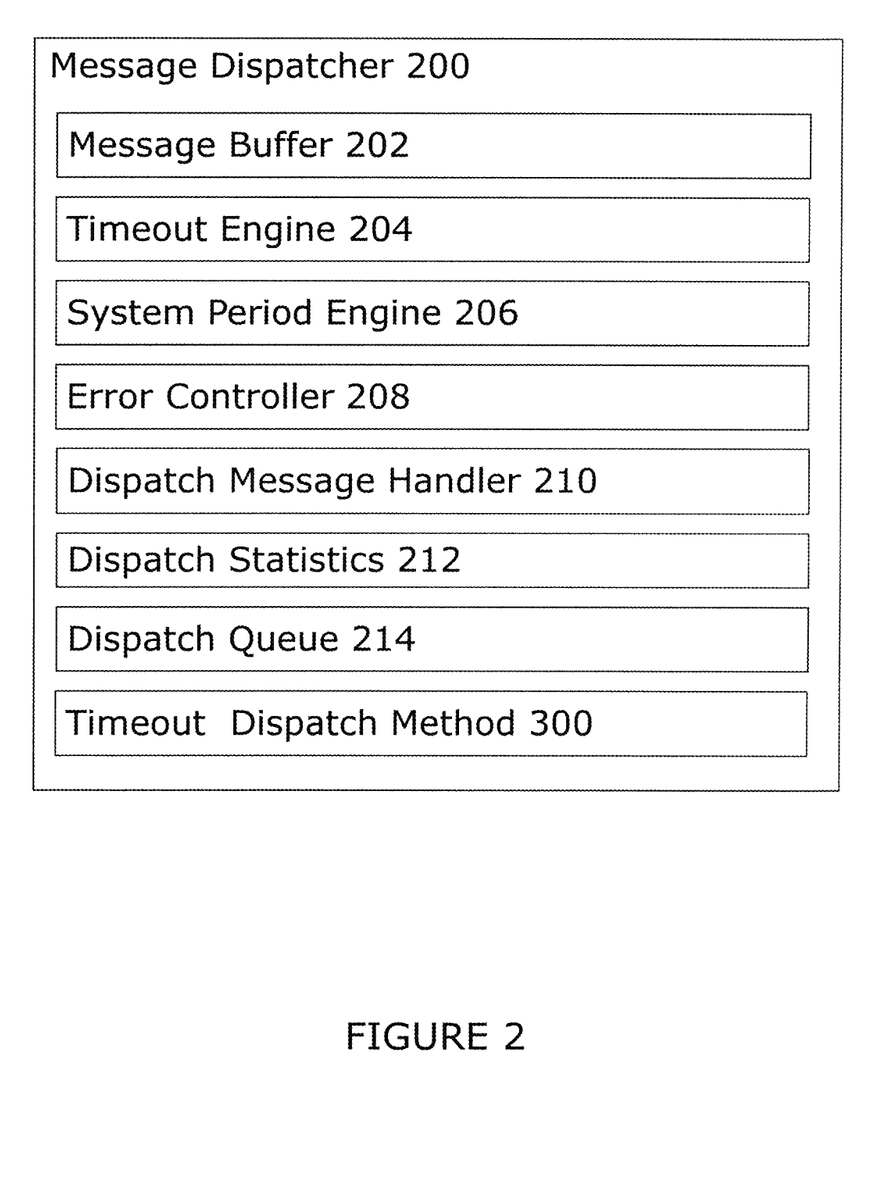
FIG. 2 is a component diagram of a message dispatcher, in accordance with embodiments of the present invention.

FIG. 2 is a component diagram of a message dispatcher, in accordance with embodiments of the present invention. Message dispatcher 200 is configured to process the function of the embodiments of the present invention. Message dispatcher 200 comprises: message buffer 202, timeout engine 204, system period engine 206, error controller 208, dispatch message handler 210, dispatch statistics 212, dispatch queue 214 and timeout dispatch method 300.

Message buffer 202 is configured to store a message after receipt of the message and before sending the message to dispatch queue 214.

Timeout engine 204 is configured to define a timeout period from message receipt time. Timeout details are specified by client 100 and stored in the message.

System period engine 206 is configured to determine a total system period for the received message. The total system period is a summation of the time that a message might spend in the dispatch queue and the period a message might spend traversing the processing nodes.

Error controller 208 is configured to send a timeout error to the client when the timeout period is smaller than the total processing period.

Dispatch message handler 210 is configured to estimate a period during which a message might spend in dispatch queue 214. The period may be estimated from the product of an average time spent in queue per message value and the number of messages in dispatch queue 214 at a current time. Dispatch message handler 210 is also configured to calculate a time spent in the queue for a message via a periodic sampling of messages that are in the queue but could also be for a periodic sampling of every message. The time that a message enters the queue (A) is recorded and the time when the message leaves the queue (L) is recorded. The difference (L−A) is used to calculate an average time in the message queue per message from the number of messages that were in the queue when the message entered the queue. The time in message queue per message is then averaged for a number of messages.

Dispatch statistics 212 is configured to store the average time in the queue per message.

Dispatch queue 214 is configured to store messages that are to be sent through the processing nodes prior to starting a journey through the processing nodes.

Timeout dispatch method 300 is configured to control message dispatcher 200 to perform methods of the present invention.

Figure 3A:
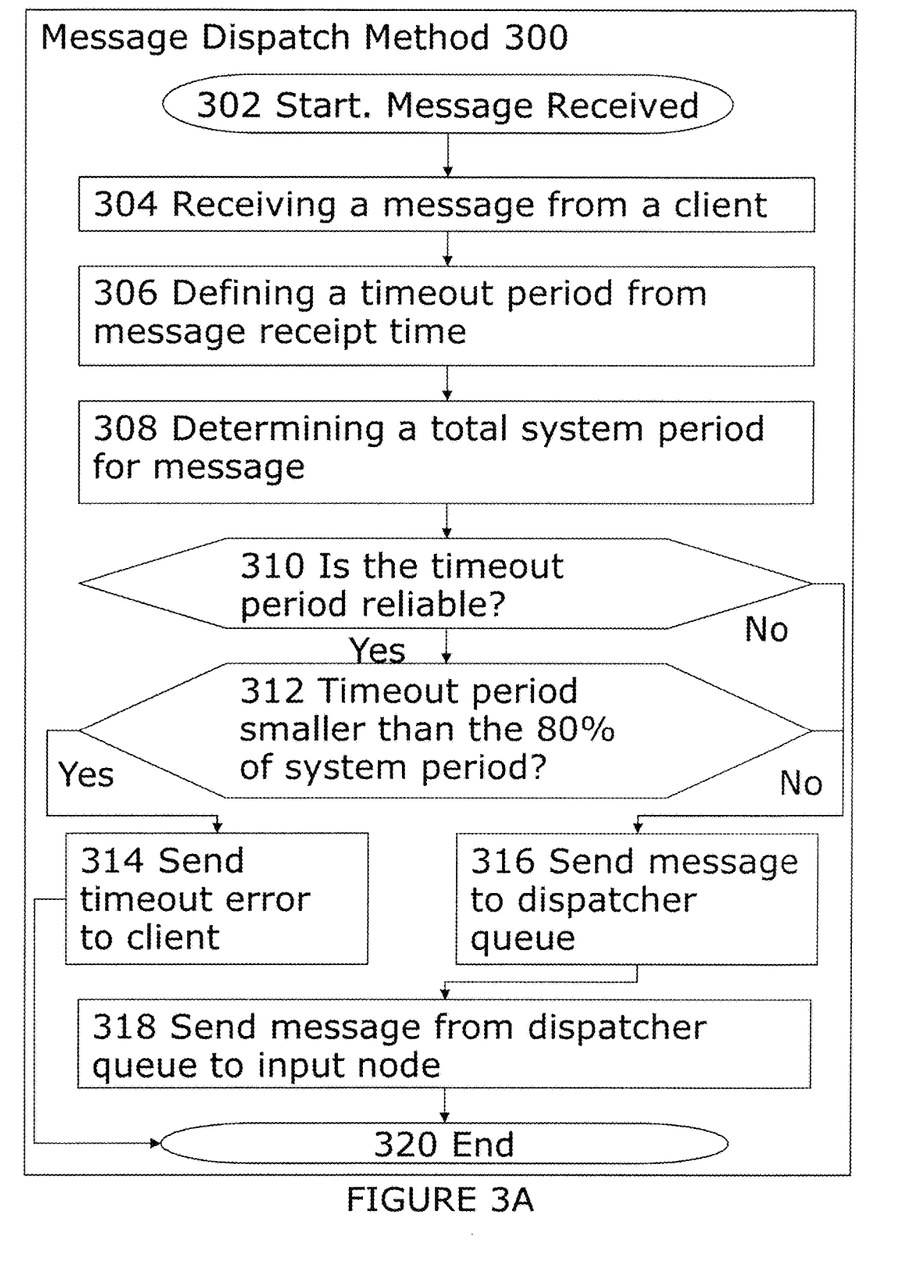
FIGS. 3A and 3B are flow diagrams of a method, in accordance with embodiments of the present invention.
Figure 3B:
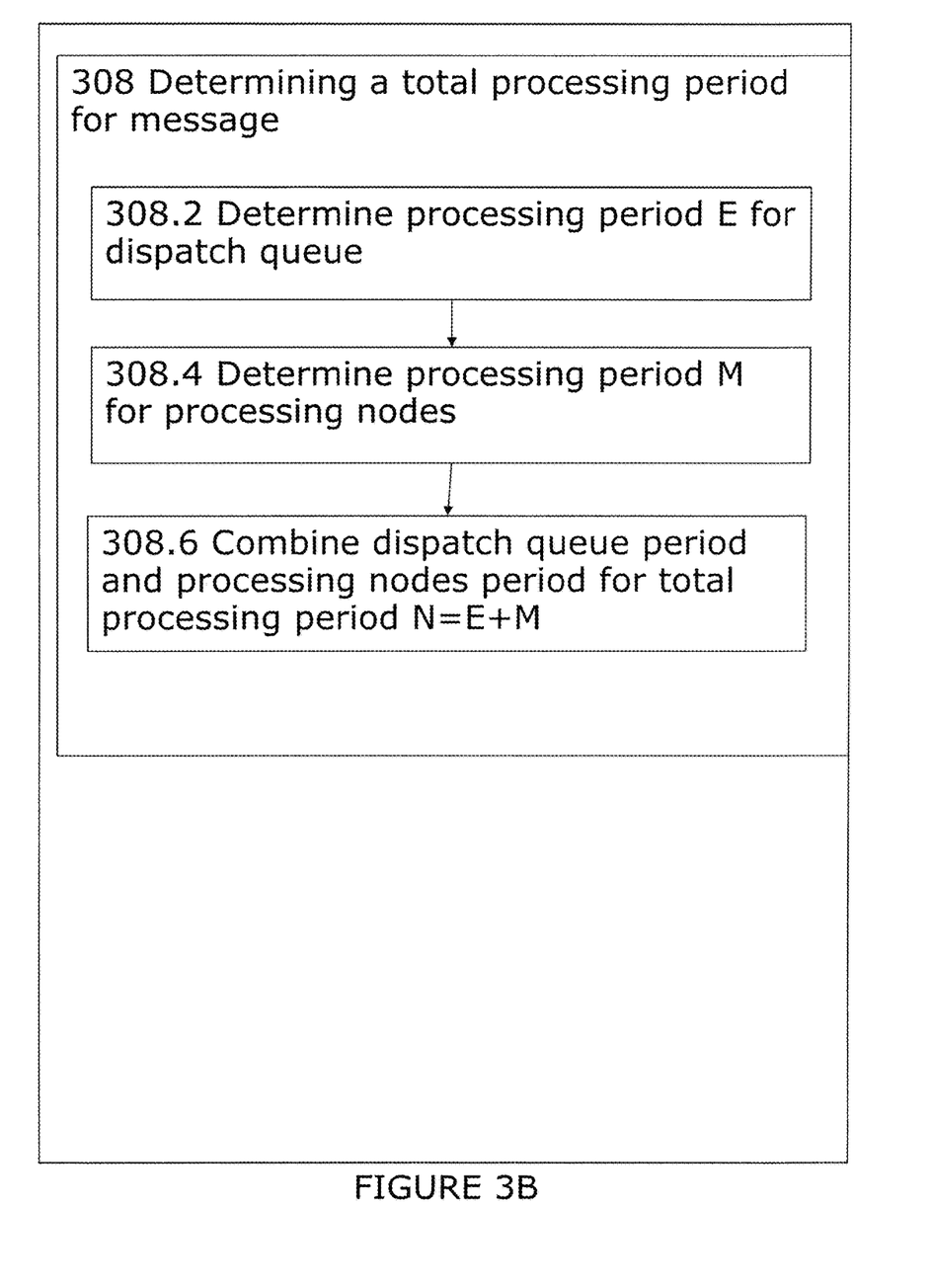

FIGS. 3A and 3B are flow diagrams of a method, in accordance with embodiments of the present invention.

Referring to FIG. 3A, an embodiment of message dispatch method 300 is configured for message handling in the message dispatcher 200 including the client 100 and an input node. Message dispatch method 300 comprises logical process steps 302 to 320. Although there is an order of the steps in the embodiment shown in FIG. 3A, the steps are not necessarily in this order for other embodiments.

Step 302 is the start of the method when a message is received from the client 100.

Step 304 receives and buffers the message in message buffer 202.

Step 306 defines a timeout period from message receipt time which is performed by the timeout engine 204 and is normally based on timeout details specified by the client 100 and stored in the message. However, a default timeout period can be applied by work dispatcher server 102. There is no client specified timeout period.

Step 308 determines a total system period for the message which is performed by system period engine 206. In one embodiment, the processing period is estimated by combining the time duration of messages in the dispatch queue 214 and a minimum time for a message to be processed by the processing nodes. Other embodiments are envisaged where the processing period is estimated just from a minimum time for a message to be processed by the processing nodes. Further embodiments are envisaged where the processing period is estimated from the average time for a message to be processed by the processing nodes. The processing period is calculated independently from messages sent back from processing nodes and determining the processing period comprises polling the calculated processing period at time intervals.

Step 310 branches to step 312 when the timeout period is considered reliable. Otherwise, when the timeout period cannot be determined or is unreliable then step 316 is performed. The determined processing time estimate is deemed unreliable if the number of sampled messages are below a threshold number such as, for example, 10 sampled messages.

Step 312 branches to step 314 when the timeout period is smaller than a specified threshold percentage of the processing period. Otherwise step 316 is performed. In one embodiment, the threshold percentage is 80% and other embodiments are envisaged where the threshold percentage is, for example, any percentage in a range of 70% to 90%.

Step 314 sends a timeout error to the client 100 which is performed by error controller 208, followed by execution of step 320.

Step 316 sends the message to dispatcher queue 214.

Step 318 sends the message from dispatcher queue 214 to input node 150A. Thereafter, dispatcher engine 104 takes over the message flow.

Step 320 is the end of message dispatch method 300.

In one embodiment, a processing node is a node in worker dispatcher system 10 (e.g., work dispatcher nodes 150A to 150N), but can be any type of computer processing node. A dispatcher is a server in a worker dispatcher system 10 (e.g., message dispatcher 200) but can be any type of computer server. A client is any type of client including a client in a worker dispatcher system (e.g., client 100) or a client in a client server system.

In one embodiment the message is only sent through the processing nodes if there is a chance that the message will be processed in a sufficiently short time, thereby saving time and resource of nodes processing a message that has already timed out.

The embodiments of the present invention reduce the risk of connection error. Furthermore, the embodiments of the present invention reduce the risk of wasted time and resources used to process the connection error as errors compound such, as for example, in an error snowball effect.

In the embodiments of the present invention, it is the server that is detecting performance issues and managing the performance issues.

In the embodiments of the present invention, the input node load can be reduced by early detection by the message dispatcher method 300.

Referring to FIG. 3B, step 308, which determines a total system period for message, comprises logical process sub-steps 308.2 to 308.6.

Step 308.2 determines the expected time through the dispatch queue E (e.g., dispatch queue 214). E equals a product of the current queue length Q (i.e., number of messages currently in the dispatch queue) and the average time in the queue per message P to obtain an estimate of how long it will take for the Q messages to pass through the dispatch queue. A value for the average time in the queue per message is continuously updated for every new message arriving in the queue. Step 308.2 multiples the average time in the queue per message P by number of messages in the queue Q.

Estimation of the average time in the dispatch queue per message P is implemented by, recording a time when a message enters the dispatch queue (A). The time when the message leaves the queue (L) is recorded and the time the message is in the queue (T) is estimated as L−A. Dividing T by Q gives the average time in the queue per message and is therefore P=T/Q=(L−A)/Q. Estimation of P can be performed by the message dispatcher 200 or by a parallel process.

Step 308.4 determines the processing period for a message traversing the processing nodes (M) which is implemented by querying node interface 106.

Step 308.6 determines the total processing period N=M+E by combining the time period through the dispatcher queue and the time period through the processing nodes. A parallel process uses the start and end time of messages through the nodes to estimate the total time through the nodes.

Table 1 provides examples of implementing an error throw condition.

TABLE 1

| Example | Count (C) | Timeout Period (X), ms | Total System Period (M + E = N), ms | Error Throw Condition (X − 0.8N) | Results and Comments |
|---|---|---|---|---|---|
| 1 | 3 | 3 | 10 | −5 | Send, since C < 10 messages |
| 2 | 13 | 3 | 10 | −5 | Error, since (X − 0.8N) < 0 |
| 3 | 23 | 15 | 10 | 7 | Send, since (X − 0.8N) > 0 |

TABLE 1-continued

| Example | Count (C) | Timeout Period (X), ms | Total System Period (M + E = N), ms | Error Throw Condition (X − 0.8N) | Results and Comments |
|---|---|---|---|---|---|
| 4 | 33 | 8 | 10 | 0 | Send, since (X − 0.8N) = 0 |
| 5 | 43 | 7 | 10 | −1 | Error, since (X − 0.8N) < 0 |

An error throw condition may be expressed as $$(X-0.8*(M+E))<0 \text{ or } (X-0.8N)<0$$

If the error throw condition is fulfilled, then the error is thrown. The count C is the number of messages currently in the dispatch queue, X is the timeout period; M is the processing period of the nodes, F is the expected time through the dispatch queue, and N=M+E.

In example 1, the number of counts C=3, the timeout period X=3, and the total system period N=10. The error throw condition is −5 which is less than 0. However, the count is less than a 10 message threshold; therefore the message is sent through the processing nodes.

For examples 2 to 5, the counts are more than 10 so the count number C is not a factor for determining the result.

In example 2, the timeout period X=3 and the total system period N=10. The error throw condition is −5 which is less than 0. However, since count C=13, which is more than a 10 message threshold, the error is thrown.

In example 3, the timeout period X=15 and the total system period N=10. The error throw condition is 7 which is not less than 0 and therefore the message is sent through the processing nodes.

The present invention improves utilization of the computer or computer system of the work dispatch system 10, by processing messages more efficiently in less time, reducing unnecessary use of resources to process connection errors by preventing or reducing the occurrence of connection errors, and reducing the input load on the system. The preceding advantages of the present invention also improve the technology of data queue management in consideration of controlling the sending the messages from dispatch queue 214 to the processing nodes.

In example 4, the timeout period X=8 and the total system period N=10. The error throw condition is 0 which is not less than 0 and therefore the message is sent through the processing nodes.

In example 5, the timeout period X=7 and the total system period N=10. The error throw condition is −1 which is less than 0 and therefore the error is thrown.

Figure 4:
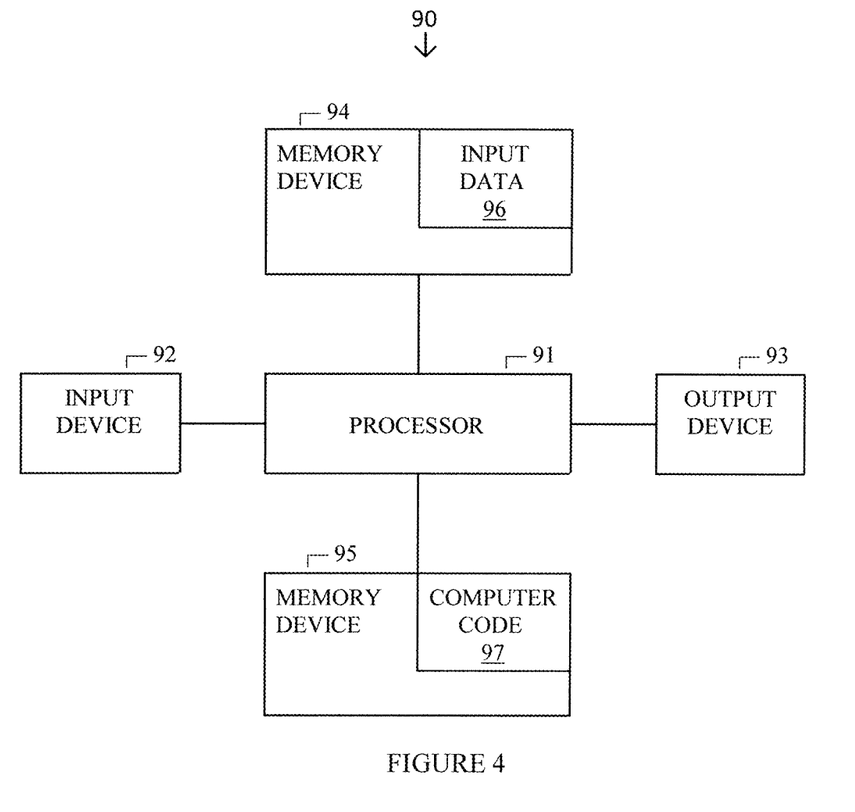
FIG. 4 illustrates a computer system used for implementing the methods of the present invention.

FIG. 4 illustrates a computer system 90 used for implementing the methods of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes software or program instructions that may implement methods of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may include the computer sable storage medium (or the program storage device).

Thus a process for supporting, deploying and/or integrating computer infrastructure, integrating, hosting, maintaining, and deploying computer-readable code into the computer system 90 is disclosed, wherein the code in combination with the computer system 90 is capable of implementing the methods of the present invention.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

An embodiment or variant of the computer system 90 is the computer server 12 of FIG. 2. A computer program product of the present invention includes one or more computer readable hardware storage devices having computer readable program code stored therein, said program code containing instructions executable by one or more processors of a computing system (or computer system) to implement the methods of the present invention.

A computing system (or computer system) of the present invention includes one or more processors, one or more memories, and one or more computer readable hardware storage devices, said one or more hardware storage devices containing program code executable by the one or more processors via the one or more memories to implement the methods of the present invention.

Further embodiments of the invention are now described. It will be clear to one of ordinary skill in the art that all or part of the logical process steps of embodiments of the present invention may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the embodiments of the present invention may alternatively be embodied fully or partially in a parallel computing system comprising two or more processors for executing parallel software.

A further embodiment of the present invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

The present invention may be a system, a method, and/or a computer program product. The computer program product may include a computer readable storage medium (or medial having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for message handling in a work dispatcher computer system that includes a client computer, a dispatch queue and one or more processing nodes, said method comprising:
    determining, by one or more processors of the work dispatcher computer system, a total time as a sum of a first e value and a second time value, wherein the first time value is an estimate of an amount of time that a message received from the client computer will spend in the dispatch queue after the message enters the dispatch queue, said estimate of the amount of time being based on an average time that N individual messages previously spent in the dispatch queue, wherein N is at least 2, and wherein the second time value is an estimate of a minimum time or an average time for the message to be processed by the one or more processing nodes;
    determining, by the one or more processors, whether N is at least a specified threshold number of messages;
    in response to determining, by the one or more processors, that N is at least the specified threshold number of messages, ascertaining whether a defined timeout period is not less than a specified threshold percent of the total time;
    in response to said ascertaining ascertains that the defined timeout period is not less than the specified threshold percent of the total time, then sending, by the one or more processors, the message to the dispatch queue; and sending, by the one or more processors, the message from the dispatch queue to a first processing node of the one or more processing nodes; and
    in response to said ascertaining ascertains that the defined timeout period is less than the specified threshold percent of the total time, then sending, by the one or more processors, a timeout error indication to the client computer instead of sending the message to the dispatch queue.

2. The method of claim 1, wherein the client computer does not specify the timeout period.

3. The method of claim 1, wherein the second time value is an estimate of the minimum time for the message to be processed by the one or more processing nodes.

4. The method of claim 3, wherein the minimum time for the message to be processed by the one or more processing nodes is estimated from a plurality of start and finish times of messages passing through the one or more processing nodes.

5. The method of claim 1, wherein said the second time value is an estimate of the average time for the message to pass through the one or more processing nodes and a minimum time for the message to be processed by the one or more processing nodes.

6. The method of claim 1, wherein said ascertaining ascertains that the defined timeout period is not less than the specified percent of the total time.

7. The method of claim 1, wherein the specified threshold percent is in a range of 70 percent to 90 percent.

8. The method of claim 1, wherein said ascertaining ascertains that the defined timeout period is less than the specified percent of the total time.

9. A work dispatcher computer system, comprising one or more processors, one or more memories, and one or more computer readable hardware storage devices, said one or more hardware storage device containing program code executable by the one or more processors via the one or more memories to implement a method for message handling in the work dispatcher computer system that includes a client computer, a dispatch queue and one or more processing nodes, said method comprising:
    determining, by the one or more processors, a total time as a sum of a first time value and a second time value, wherein the first time value is an estimate of an amount of time that a message received from the client computer will spend in the dispatch queue after the message enters the dispatch queue, said estimate of the amount of time being based on an average time that N individual messages previously spent in the dispatch queue, wherein N is at least 2, and wherein the second time value is an estimate of a minimum time or an average time for the message to be processed by the one or more processing nodes;
    determining, by the one or more processors, whether N is at least a specified threshold number of messages;
    in response to determining, by the one or more processors, that N is at least the specified threshold number of messages, ascertaining whether a defined timeout period is not less than a specified threshold percent of the total time;
    in response to said ascertaining ascertains that the defined timeout period is not less than the specified threshold percent of the total time, then sending, by the one or more processors, the message to the dispatch queue; and sending, by the one or more processors, the message from the dispatch queue to a first processing node of the one or more processing nodes; and in response to said ascertaining ascertains that the defined timeout period is less than the specified threshold percent of the total time, then sending, by the one or more processors, a timeout error indication to the client computer instead of sending the message to the dispatch queue.

10. The work dispatcher computer system of claim 9, wherein the client computer does not specify the timeout period.

11. The work dispatcher computer system of claim 9, wherein the second time value is an estimate of the minimum time for the message to be processed by the one or more processing nodes.

12. The work dispatcher computer system of claim 11, wherein the minimum time for the message to be processed by the one or more processing nodes is estimated from a plurality of start and finish times of messages passing through the one or more processing nodes.

13. The work dispatcher computer system of claim 9, wherein said the second time value is an estimate of the average time for the message to pass through the one or more processing nodes and a minimum time for the message to be processed by the one or more processing nodes.

14. The work dispatcher computer system of claim 9, wherein said ascertaining ascertains that the defined timeout period is not less than the specified percent of the total time.

15. A computer program product, comprising one or more computer readable hardware storage devices having computer readable program code stored therein, said program code containing instructions executable by one or more processors of a work dispatcher computer system to implement a method for message handling in the work dispatcher computer system that includes a client computer, a dispatch queue and one or more processing nodes, said method comprising:
   determining, by the one or more processors, a total time as a sum of a first time value and a second time value, wherein the first time value is an estimate of an amount of time that a message received from the client computer will spend in the dispatch queue after the message enters the dispatch queue, said estimate of the amount of time being based on an average time that N individual messages previously spent in the dispatch queue, wherein N is at least 2, and wherein the second time value is an estimate of a minimum time or an average time for the message to be processed by the one or more processing nodes;
   determining, by the one or more processors, whether N is at least a specified threshold number of messages;
   in response to determining, by the one or more processors, that N is at least the specified threshold number of messages, ascertaining whether a defined timeout period is not less than a specified threshold percent of the total time;
   in response to said ascertaining ascertains that the defined timeout period is not less than the specified threshold percent of the total time, then sending, by the one or more processors, the message to the dispatch queue; and sending, by the one or more processors, the message from the dispatch queue to a first processing node of the one or more processing nodes; and
   in response to said ascertaining ascertains that the defined timeout period is less than the specified threshold percent of the total time, then sending, by the one or more processors, a timeout error indication to the client computer instead of sending the message to the dispatch queue.

16. The computer program product of claim 15, wherein the client computer does not specify the timeout period.

17. The computer program product of claim 15, wherein the second time value is an estimate of the minimum time for the message to be processed by the one or more processing nodes.

18. The computer program product of claim 17, wherein the minimum time for the message to be processed by the one or more processing nodes is estimated from a plurality of start and finish times of messages passing through the one or more processing nodes.

19. The computer program product of claim 15, wherein said the second time value is an estimate of the average time for the message to pass through the one or more processing nodes and a minimum time for the message to be processed by the one or more processing nodes.

20. The computer program product of claim 15, wherein said ascertaining ascertains that the defined timeout period is not less than the specified percent of the total time.

* * * * *